(12) United States Patent
Boness et al.

(10) Patent No.: US 8,351,829 B2
(45) Date of Patent: Jan. 8, 2013

(54) METHOD OF PREVENTING A REGISTRATION ERROR WHILE PRINTING

(75) Inventors: Jan D. Boness, Bad Bramstedt (DE); Heiko Hunold, Wattenbeck (DE); Stefan Schrader, Kiel (DE); Matthias Wecker, Bebra-Asmushausen (DE)

(73) Assignee: Eastman Kodak Company, Rochester, NY (US)

( * ) Notice: Subject to any disclaimer, the term of this patent is extended or adjusted under 35 U.S.C. 154(b) by 1040 days.

(21) Appl. No.: 12/281,050

(22) PCT Filed: Aug. 30, 2006

(86) PCT No.: PCT/EP2006/008476
§ 371 (c)(1),
(2), (4) Date: Dec. 5, 2008

(87) PCT Pub. No.: WO2007/098792
PCT Pub. Date: Sep. 7, 2007

(65) Prior Publication Data
US 2009/0153889 A1    Jun. 18, 2009

(30) Foreign Application Priority Data
Mar. 1, 2006    (DE) .......................... 10 2006 009 773

(51) Int. Cl.
*G03G 15/01*    (2006.01)
*G03G 15/00*    (2006.01)

(52) U.S. Cl. ......................................... 399/299; 399/36
(58) Field of Classification Search ................. 399/299, 399/301, 36, 46, 77, 78
See application file for complete search history.

(56) References Cited

U.S. PATENT DOCUMENTS

| | | | |
|---|---|---|---|
| 5,506,671 A | 4/1996 | Buts et al. | |
| 6,185,402 B1 | 2/2001 | Linssen | |
| 6,249,664 B1 * | 6/2001 | Sato | ............................. 399/256 |
| 6,836,635 B2 * | 12/2004 | Metzler et al. | ................ 399/301 |
| 2002/0114650 A1 * | 8/2002 | May et al. | ..................... 399/302 |
| 2004/0086304 A1 | 5/2004 | Metzler et al. | |
| 2005/0238372 A1 | 10/2005 | Shinohara et al. | |

* cited by examiner

*Primary Examiner* — Walter L Lindsay, Jr.
*Assistant Examiner* — Rodney Bonnette
(74) *Attorney, Agent, or Firm* — Andrew J. Anderson (57) ABSTRACT

A method of preventing a registration error while printing at least one printing image, wherein, in order to control or adjust the correct length of the printing image, the start and/or the distance of the printing image lines of the printing image are controlled by determining the ratio of the number of rotary encoder signals of a transport web counted during a specific time interval to the number of rotary encoder signals of a cylinder of a printing and by taking into account a change of this ratio as a correction, said ratio being a function of a printing sheet located in a printing nip between the transport web and the printing unit, is characterized in that a changed printing material situation occurring in said printing nip between the transport web and the printing unit is used to achieve registration accuracy immediately.

15 Claims, 4 Drawing Sheets

METHOD OF PREVENTING A REGISTRATION ERROR WHILE PRINTING

The invention relates to a method of preventing a registration error while printing at least one printing image, in particular at least one color separation image of a multi-color print, preferably with the use of a digital printing machine, preferably with an electrophotographically operating printing machine, wherein, in order to control or adjust the correct length of the printing image, the start and/or the distance of the printing image lines of the printing image are controlled by determining the ratio of the number of rotary encoder signals of a transport web counted during a specific time interval, said transport web transporting the printing sheets, to the number of rotary encoder signals of a cylinder of a printing unit detected during the same time interval, said cylinder participating in the printing operation and moving directly or indirectly with the transport web, and by taking into account a change of this ratio as a correction, said ratio being a function of a printing sheet located in a printing nip between the transport web and the printing unit, and whereby, in order to achieve the desired registration accuracy, a certain mean value of time is determined by way of determining said ratio.

First, the aforementioned method is in fact to be used to avoid registration errors during the actual execution of print jobs, which errors could be caused by changes in the printing machine, for example, due to thermal changes of the cylinders in a printing unit. In the present case, the subject matter that is of main interest is the so-called "magnification" error.

In conjunction with this, however, it is known, when a printing machine is calibrated before print jobs are carried out and when the mean value is basically taken into consideration as for example in DE 102 08 597 A1, that a printing material sheet in the nip between the transport web and the printing unit also results in changes of conditions which result in corresponding registration errors. This is because a control value is changed by the presence of a printing material sheet in the respective printing unit. A printing material sheet supported on a participating cylinder, in particular a rubber-sheet cylinder or "Blanket Cylinder (BC)" results in an apparent increase of the radius of the cylinder, as a result of which the angular velocity of the cylinder in the corresponding printing unit is reduced and thus also the angular velocity and surface velocity of the corresponding other cylinders, in particular, an "Imaging Cylinder (IC)" is reduced. This results in a changed ratio of pulse rates on the cylinder relative to those of the rotary encoder of the transport web, because the transport web drive continues to rotate at a constant velocity and the cylinders are now rotating along with the transport web in a changed manner. Consequently, a control device computes an adjustment control value that is affected by the printing material sheet.

By determining the mean of the detected values and by a transfer that is delayed by the control device, a control change acts only in a delayed manner, which, in turn, can lead to registration errors and, for example, can particularly visibly manifest itself on the rear edge of a printing material sheet. Therefore, even when the presence of a printing material sheet is basically taken into consideration in the mean value, it is still possible for changes of the printing material conditions to result in problems in the printing nip of the printing unit and thus cause registration errors. With sheet printing, for example, there are always "bare" unoccupied intermediate spaces on the transport web between the printing material sheets at relatively rapid succession, said intermediate spaces potentially having different sizes because, for example, different sheet formats are printed or because some sheets return for verso-printing and others do not and thus leave corresponding gaps. This, too, repeatedly results in a changed printing material situation, and not only the change of the printing material itself, for example, because the different printing materials are supplied by different feeding units.

Therefore, referring to a method of the aforementioned type, the object of the invention is to enable a quick response of a control or an adjustment and to avoid deviations in the best-possible stable operating state of a control device.

In accordance with the invention, this object is achieved in that a changed printing material situation occurring in said printing nip between the transport web and the printing unit is used to achieve registration accuracy by immediately taking into consideration a correction value that takes into account the changed printing material situation.

Therefore, in accordance with the invention, there is an advantageously instantaneous response to a changed printing material situation in the nip, i.e., with a printing material correction value appropriate for the situation, which, on one hand, can be fed as illustrated in detail by modifications of the invention to the actual control algorithm, in particular a filter equation, and, on the other hand, can correct the results of the control algorithm, in particular a control output signal, so that a best-possible and instant registration accuracy is achieved even up to the rear edge of a sheet.

Due to the required delay of a control device, there additionally is, during each change of the printing material situation—for example, in a sequence of an empty transport web, a transport web loaded with a printing material sheet of a type A paper, another empty transport web, a transport web loaded with a printing material sheet of a type B paper—and during each change or transition, a transient phase, in particular, a filter reaction with potentially distinct magnification errors which still considerably reduce the printing quality.

Therefore, one modification of the inventive method provides that, during the current control step, a control device that is being used is re-initialized with the appropriately stated correction value for control of the registration accuracy of the sheet currently to be printed, said sheet being subject to the mentioned change of the printing material situation, and that, as a result of this, transient phases otherwise caused by a delayed response of the control device are prevented. Advantageously, this means that a control device, in particular a filter, in accordance with the invention, does in fact not need to be "leveled out" again, although with a preferably used filter of the first order, an oscillation does not take place in the actual sense but, rather, an approximately exponentially progressing delayed response occurs.

For the correction value which corresponds to the changed printing material situation in the nip, it is preferably possible to access a table of values that has been obtained based on calibrations. In so doing, such a correction must occur separately and differently for each color of a multi-color printing machine, if necessary, and various printing material properties such as thickness, surface properties and the like, should be taken into consideration and it could even be necessary to evaluate the recto-printing side and the verso-printing side of a sheet in a different manner.

The time of arrival of the sheet and the type of sheet that will arrive in the nip basically additionally results from the information indicating what type of printing material is fed to the printing process at a specific time by a given feeder, in which case the time of arrival of the respective sheet usually is additionally detected by a lead-edge sensor (Lead Edge Sensor). Consequently, the inventive control information is not restricted to the detected rotary encoder pulses alone, but, in addition, information relating to sheet feeding can be used to identify the printing material currently to be printed as it enters the printing nip.

As already mentioned farther above, the correction value can be used in a filter equation of a filter of a control device. This may advantageously affect already the subsequent sheet in view of a correction of the now existing printing material situation. The printing lines (START OF LINES) of the printing image of the sheet currently to be printed, however, will then already be imaged and be made available for printing. Thus, in order to already achieve a correction for the current sheet, i.e., for the start of its image (START OF FRAME), another modification of the invention provides that a correction value, which takes into account a changed printing material situation in the printing nip between the transport web and the printing unit, is added to the output signal of a control device in order to achieve the desired registration accuracy for the current sheet to be printed, so that it is taken instantly into account for the sheet currently to be printed regarding said sheet's start of the printing image. Thus, to achieve this, the "detour" via a filter equation is no longer chosen but an appropriate correction value is taken into account in a truly instantaneous way.

However, in this case, the correction value must be added to the starting signal only until the control device has been initialized, in order to prevent the correction value from being taken repeatedly into account in different ways.

A stable operating state can be further improved by two additional measures. Using a pre-filter, which preferably consists essentially of low-pass filters, relatively higher-frequency modulations of the rotary encoder clock rates can be filtered out, such as are caused, for example, by eccentricity errors of the cylinders, and which are on the order of 0.5 Hz or greater, for example. Also, brief breakdowns of the situation, e.g., due to the mentioned gaps between printing material sheets, can be masked relative to the control device; this means that during these brief moments no new control algorithm results, specifically filter equations, will be computed but that the last-determined result will continue to be used for the inventive correction and for a control output signal. In so doing, in particular for a changed printing material situation, only the difference between a previous printing material and the currently present printing material could be taken into account in the way of a difference. Thus, the control device "sees", so to speak, only a continuous printing material, the quality of which changes from time to time, this having to be taken into account as quickly as possible.

The drawing (FIG. 4) shows an embodiment of a control device to be used for the inventive method, which could result in additional inventive features without, however, restricting the scope of the invention thereto. However, to provide a detailed explanation of the technical problem known from prior art, FIGS. 1 through 3 show in FIG. 1a, 1b respectively, a schematic view of a section of a transport web with a cylinder above the transport web and a pressure roller below the trans-port web, to illustrate the principle of a magnification error;

Figure 1A:
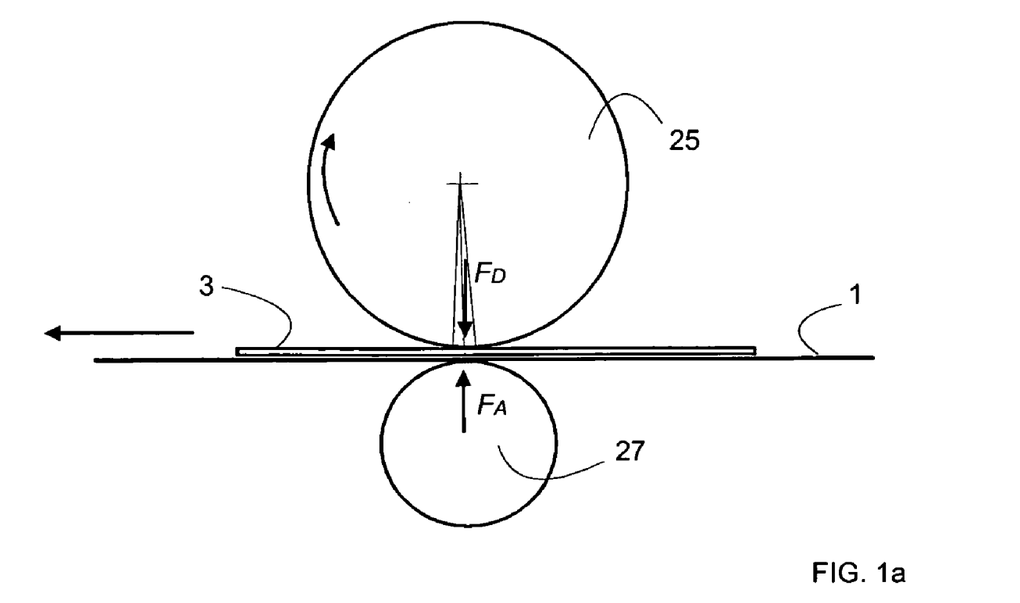

FIG. 1a shows a schematic view of a section of a transport web 1. Hereinafter is a description of a calibration cycle of a printing machine for the calibration of print registers. The transport web 1 is tensioned continuously around the deflecting rollers 14, 16. In this example, a printing cylinder 25 is an intermediate cylinder which receives the image from an imaging cylinder 23 and transfers said image to a printing material 3. The printing cylinder 25 can also apply the image directly. The printing cylinder 25 applies a force FD from above onto the transport web 1, as illustrated by the force-indicating arrow. A pressure roller 27 applies a force FA from below, opposite the force FD, onto the transport web 1 of the printing machine. The pressure roller 27 is supported by pneumatic means and, under ideal conditions, applies a uniform constant force FA onto the transport web 1 as in FIG. 1a; in so doing, the contact pressure of the pressure roller 27 does not change. In this example, the pressure roller 27 yields when the printing material 3 enters in a printing nip, or nip, 9, without changing the contact pressure applied by the printing cylinder 25 onto the transport web 1. The transport web 1 is driven by a motor, moves at a specific speed in the direction of the arrow and moves the printing cylinder 25 and the pressure roller 27 by means of frictional engagement. The three lines which extend in the printing cylinder 25 from the axis to the circumference of the printing cylinder 25 symbolically illustrate the distances of the image lines and are shown farther spaced apart for better explanation. At each point where the three lines intersect with the circumference of the printing cylinder 25, one image line is printed on the printing material 3. The distances between the image lines in FIG. 1a are assumed to be ideal and without registration error. Consequently, in FIG. 1a, there are still no changing forces of contact pressure by the pressure roller 27, which forces could be of influence. However, also here, eccentricity errors of the cylinders 23, 25 or elasticity characteristics of these cylinders 23, 25 could already result in registration errors, whereby "registration error" is used here as a general term, including a "registration mark error".

Figure 1B:
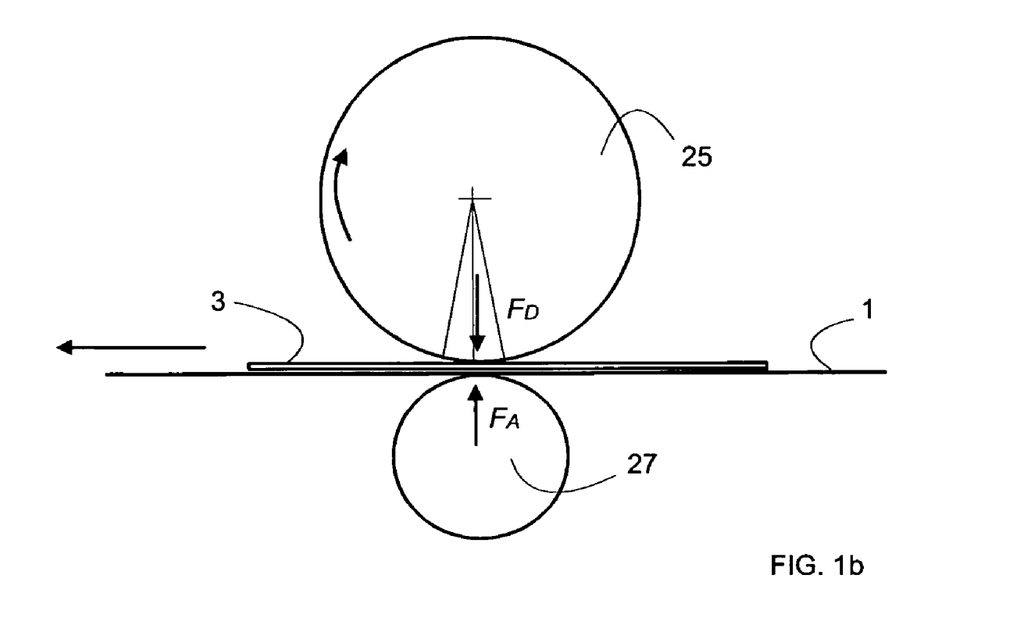

FIG. 1b shows an illustration that is similar to FIG. 1a, indicating the effect of a registration error. In this figure, the real situation is shown, in which the contact pressure of the pressure roller 27 is variable. The less compression of the printing material 3 is possible, the more the pressure roller 27 is deflected and the higher is the contact pressure and the registration error as a result of a non-ideal pneumatic support of the pressure roller 27. The three lines in the printing cylinder 25 are at a greater distance from each other. Thus, it follows that the image lines on the printing material 3 are at a greater distance from each other compared with FIG. 1a, and that the resolution of the image lines has changed. When printing the three image lines on the printing material 3, the three image lines are at a greater distance from each other. In the illustration as in FIG. 1b, it is assumed that the angular velocity of the printing cylinder 25 is approximately constant. This prerequisite is not met during operation because the angular velocity of the printing cylinder 25 changes as a function of the contact pressure of the pressure roller 27; however, this does not affect the resolution of the image lines. On one hand, the registration error of a changed resolution of the image lines is caused by the fact that a yielding of a compressible printing material 3 increases the contact pressure caused by the pressure roller 27. On the other hand, for the same reasons, the printing material 3 expands, whereby this contributes less to the illustrated effect than the increasing contact pressure. This error is referred to as the "magnification" error.

In FIG. 1b, the influence of the changing forces of the contact pressure of the pressure roller 27 exists and causes such a registration error. The aforementioned effect is stronger when a sheet 3 enters the nip 9 and when eccentricity fluctuations of the printing cylinder 25 or the pressure roller 27 exist. As a result, the printed image is adulterated. The change of the resolution of the image lines, i.e., the distances of the image lines from each other, can be determined during a calibration by measuring the registration marks.

Figure 2A:
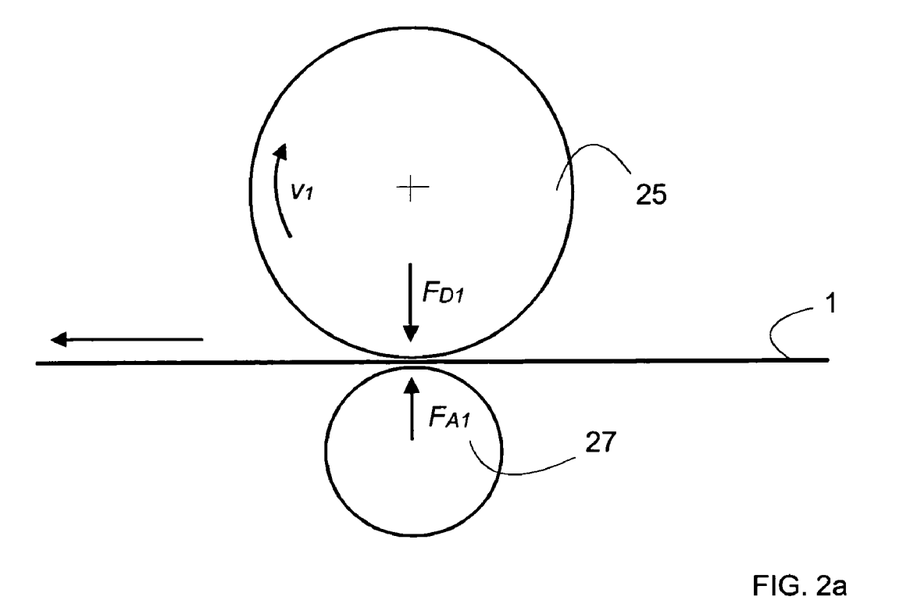
FIG. 2a a schematic view of a section of a transport web with a cylinder above the transport web and a pressure roller below the transport web, to illustrate the forces acting without printing material.

FIG. 2a is a schematic view of a section of a transport web 1. The transport web 1 is continuously tensioned around the deflecting rollers 14, 16. In this example, a printing cylinder 25 is an intermediate cylinder which receives the image from an imaging cylinder 23 and transfers said image to a printing material 3 or to the transport web 1. In FIG. 2a, there is no printing material in the printing nip between the printing cylinder 25 and the transport web 1, namely the gap or the nip 9. The printing cylinder 25 applies a force FD1 from above onto the transport web 1, as indicated by the force-indicating arrow. A pressure roller 27 applies a force FA1 from below (against the force FD1) onto the transport web 1 of the printing machine. The pressure roller 27 is supported by pneumatic means and applies a variable force FA 1 onto the transport web 1. As the force FD1 applied by the printing cylinder 25 increases, the pressure roller 22 yields to some extent; however, the contact pressure of the printing cylinder 25 onto the transport web 1 still fluctuates. The transport web 1 is driven by a motor, moves at a specific speed in the direction of the arrow and moves the printing cylinder 25 and the pressure roller 27 by frictional engagement. In FIG. 2a, the printing cylinder 25 has a velocity $v_1$. It should be noted that the velocity $v_1$, of the printing cylinder 25 varies with the contact pressure applied by the forces FD1 and FA1. As the contact pressure of the printing cylinder 25 increases, the rotational speed of the printing cylinder 25 decreases. A change of the rotational speed of the printing cylinder 25 affects the registered application of the image and results in errors during registered transfer of an image frame or frame applied at the wrong time. Referring to a calibration cycle, the term image frame or frame refers to a frame of registration marks which are applied by different printing modules of the printing machine, whereas, referring to a print job, this term—depending on the context—may denote the area of the printed image or the area of a printing sheet. For example, the frame in a four-color printing machine contains the registration marks for the colors Cyan, Magenta, Yellow and Key, said marks being applied by the corresponding printing modules to the printing material 3 or to the transport web 1. During the printing operation, the image frame or frame comprises the entire image information of a color for the printing material 3 that is to be printed. The erroneous transfer of the image frame or frame to the printing material 3 or to the transport web 1 is also a registration error. During the transfer of a registration mark to the transport web 1, for example, during a calibration cycle of the printing machine, the errors of the image frame or frame caused by the aforementioned effects can be detected by measuring the shifts of the registration marks with respect to an error-free location of the registration marks.

Figure 2B:
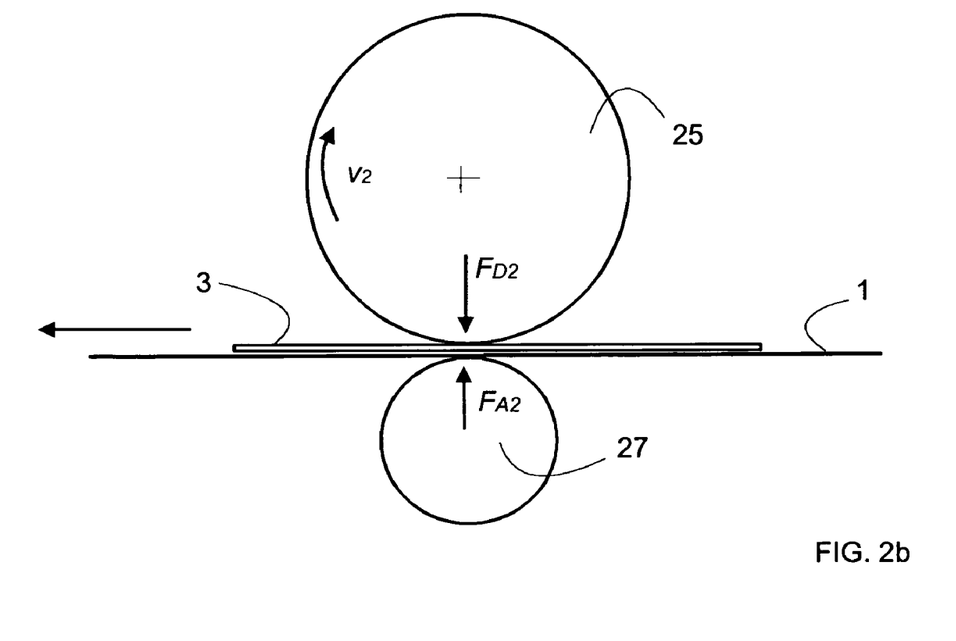
FIG. 2b a schematic view of a section of a transport web with a cylinder above the transport web and a pressure roller below the transport web, to illustrate the forces acting with printing material.

FIG. 2b shows an illustration that is similar to that of FIG. 2a. The printing material 3—in this case a sheet of paper—is located on the transport web 1 between the printing cylinder 25 and the transport web 1, said paper being transported by the transport web 1. Generally, the printing material 3 is held on transport web 1 to a small part by its own force of weight and to a larger part due to an electrostatic charge of the transport web 1. Due to its thickness, the printing material 3 additionally affects the contact pressure of the printing cylinder 25. The force of the printing cylinder 25 acting on the printing material 3 is now, due to the printing material 3, equal to FD2 and is not equal to FD1, under otherwise the same conditions as in FIG. 2a. The force by pressure roller 27 acting from below onto the transport web 1 is now, due to the printing material 3, equal to FA2 and is not equal to FA1. As a result of the pneumatic support of the pressure roller 27, the effects on the correctly registered printing operation are eliminated in part, however, not completely. Assuming that the pneumatic support operates in an ideal manner, the contact pressure of the pressure roller 27 does not increase as a result of the printing material 3. An ideal pneumatic support of the pressure roller 27, however, can be implemented only with considerable effort. Therefore, various registration errors do occur.

In FIG. 2b, the rotational speed of the printing cylinder 25 changes to $v_2$ not equal to $v_1$, as in FIG. 2a, where there is no influence by the printing material 3. The changed rotational speed $v_2$ causes a first registration error which is magnified as the thickness of the printing material 3 in the printing nip or nip 9 increases. Referring to this first registration error, the changed rotational speed $v_2$ first affects a sheet 3 following the current sheet 3 on the transport web 1 in the nip 9. Referring to the second registration error, the "magnification" error, the changed contact pressure already acts on the current sheet 3 in the nip 9 on the transport web 1. It is assumed that the time when the printing material 3 is printed by the printing cylinder 25 above the printing material 3 is adapted to a specific speed of the printing cylinder 25. This means that the application of an image to an imaging cylinder 23 or to the printing cylinder 25 is carried out by means of an imaging device 22 at a time such that the imaging cylinder 23 or the printing cylinder 25 transfers the toner image to the nip 9, i.e., the intermediate space between the printing material 3 and the imaging cylinder 23 or the printing cylinder 25, at a prespecified adapted rotational speed $v_1$ exactly at the desired time. Inasmuch as the rotational speed $v_2$ does not equal the adapted rotational speed $v_1$, due to the variable contact pressures of the printing cylinder 25 and the pressure roller 27, FD1 and FA1 do not equal FD2 and FA2 respectively, printing of the surface of the printing material 3 or the transport web 1 does not occur in a timely manner but is delayed by the reduced path covered by the printing cylinder 25 due to the rotational speed difference $v_2-v>$. This means that the greater the deviation of the rotational speed $v_2$ of the printing cylinder 25 is with respect to an adapted rotational speed $v_1$, the greater is the shift of the printed image on the printing material 3. It must be noted that the rotational speed change of the printing cylinder 25 occurs not only due to the described influence of a printing material 3 but also due to additional influences such as temperature changes and resultant circumferential changes of the printing cylinder 25. Furthermore, it appears that, with regard to the printing material 3, it is not only its thickness and compressibility but also its surface quality that has an effect.

Figure 3:
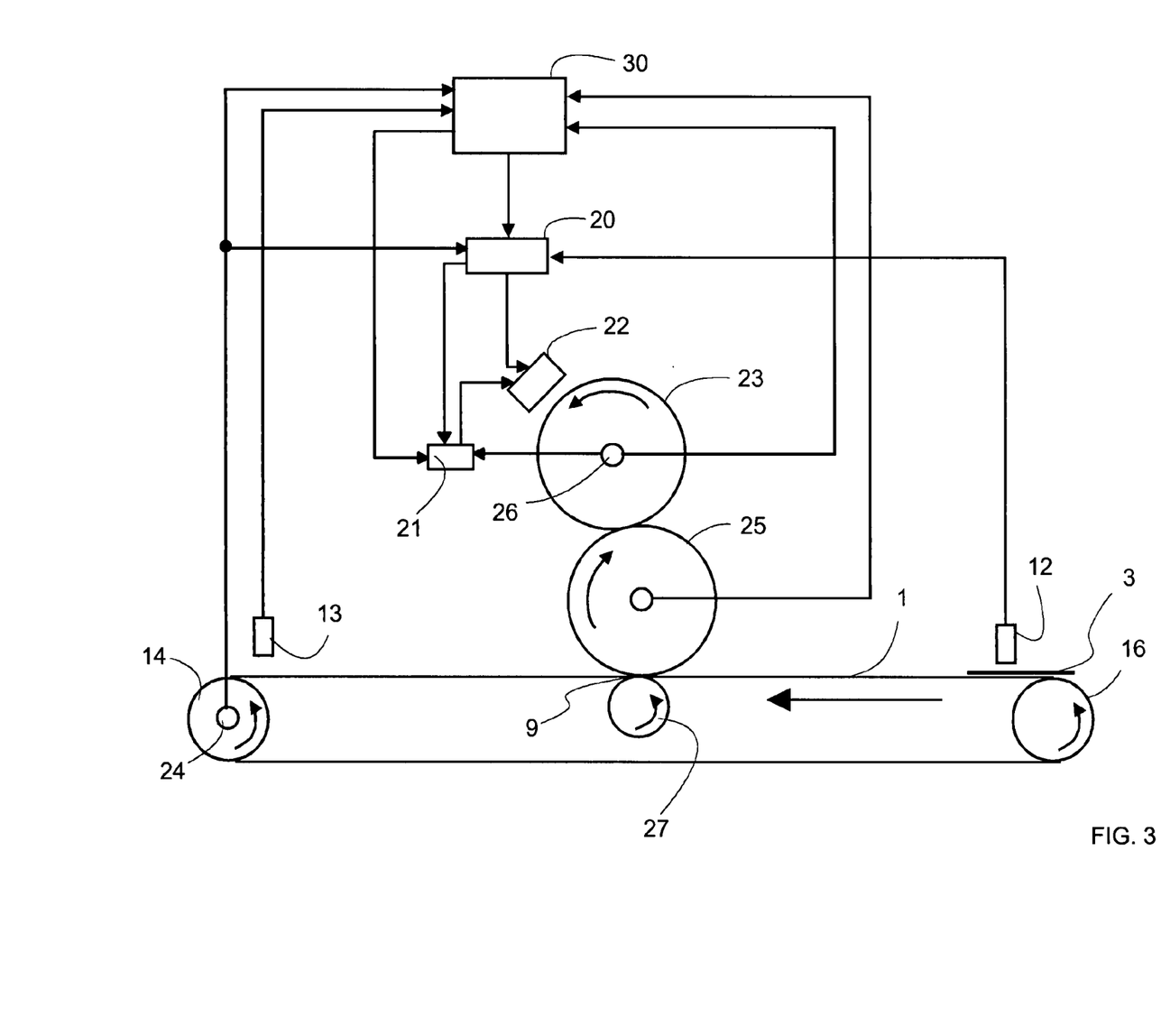
FIG. 3 a schematic view of a printing unit of an electrophotographic printing machine, to illustrate the present invention.

FIG. 3 shows a schematic side elevation of a printing unit of a printing machine comprising the continuous transport web 1 which is tensioned around a first deflecting roller 16 and around a second deflecting roller 14 and is moved by said rollers in the direction of the arrow. Below the transport web 1, a pressure roller 27 is provided, said pressure roller applying a contact pressure from below onto the transport web 1 and providing a counter-force to the contact pressure of the printing cylinder 25. In this example, the printing cylinder 25 is an intermediate cylinder which receives the toner image of an imaging cylinder 23 which is provided with the toner image by an imaging device 22. To do so, the imaging device 22 comprises the devices required therefor, namely a device for providing the photoconductive surface of the imaging cylinder 23 with an electrostatic charge, a controlled light source such as an LED array, which provides the photoconductive surface of the imaging cylinder 23 with a latent electrostatic image which is dyed with a toner by a development unit and produces an image to be printed, and furthermore comprises cleaning devices for removing excess toner following the transfer of the image to the printing material 3 and for renewed imaging of the imaging cylinder 23. The second deflecting roller 14 is associated with a first rotary encoder 24, the imaging cylinder 23 is associated with a second rotary encoder 26. The first rotary encoder 24 and the second rotary encoder 26 detect the angle of rotation of the second deflecting roller 14 and the imaging cylinder 23 respectively within specific short intervals. The first rotary encoder 24 sends signals regarding the angle of rotation of the second deflecting roller 14 to the clock counter 20 and to the device 30. The angle of rotation of the second deflecting roller 14 thus is present in the device 30 and in the clock counter 20. Connected to the imaging device 22 is a clock counter 20, which is connected to a device 30, to a first sensor 12 upstream of the printing units (for multi-color printing, as a rule there are four to five essentially similar printing units which are not shown here to avoid confusion) of the printing machine, to a clock divider 21 and to the first rotary encoder 24. A second sensor 13 downstream of the printing modules of the printing machine is connected to the device 30. In addition, the clock divider 21 is connected to the device 30, to the imaging device 22 and to the second rotary encoder 26 on the imaging cylinder 23.

In the present description, a calibration cycle is described. During the calibration cycle, the first sensor 12 upstream of the printing units of the printing machine detects the lead edge of a printing material 3 which is transported on the transport web 1. In response to the detection of the lead edge of the printing material 3, the first sensor 12 transmits a signal to the clock counter 20, this signal also being referred to as the lead edge signal. From this signal, after a specific pulse sequence has run, a first start signal, the START OF FRAME signal, is generated, which serves to trigger imaging by the imaging device 22 at exactly the correct time when the START OF FRAME signal is triggered, so that an image frame or frame is transferred to the imaging cylinder 23 and ultimately to the printing material 3—or to the transport web 1 for the purpose of the described calibration—in a timely manner. In the calibration cycle, the term image frame or frame defines a frame of registration marks which are applied by different printing units of the printing machine. For example, in four-color printing, the frame contains registration marks for the colors Cyan, Magenta, Yellow and Key, said marks being applied by the appropriate printing modules to the printing material 3 or to the transport web 1. In addition, an image frame or frame may comprise—in specific sections of the described related calibration—a number of registration marks for the individual colors. During the printing operation, the frame or the image frame may comprise the entire image information—for one color such as Cyan, Magenta, Yellow and Key—for the printing material 3 to be printed.

Furthermore, a second start signal, the START OF LINE (SOL) signal, is generated; this signal triggers the imaging of individual lines of the image perpendicular to the advance direction of the printing material 3 by means of the imaging device 22. With each START OF LINE signal, an image line is written on the imaging cylinder 23, a first image line at the start of the frame, subsequent image lines and a last image line at the end of the frame. The START OF LINE signal is generated by clock division with a divider factor by the device 30 in the clock divider 21. The clock divider 21 receives data from the second rotary encoder 26 regarding the angle of rotation of the imaging cylinder 23 and divides these data consistent with the divider factor (see also the inventive controller as in FIG. 4). The START OF LINE signal formed by clock division determines the distances at which the image lines are transferred from the imaging device 22 to the imaging cylinder 23. After the lead edge of the printing material 3 has been detected, said printing material is continued to be transported by means of the transport web 1. In the calibration cycle described here, the image frames or frames having the individual registration marks are applied by the respective printing modules to the transport web 1 and to the printing material 3. For this purpose, the registration marks are transferred from the imaging device 22 to the imaging cylinder 23 and from the latter to the printing cylinder 25. In the nip 9 or the printing nip, i.e., the region between the printing cylinder 25 and the transport web 1 or the printing material 3, the transfer of the registration marks to the transport web 1 or the printing material 3 takes place and during this process the pressure roller 27 presses from underneath of the transport web 1 against said transport web and provides a counter-force acting against the contact pressure of the printing cylinder 25.

Upon the application of the registration marks to the transport web 1 or to the printing material 3, said marks are detected downstream of the printing units by the second sensor 13, also referred to as the registration sensor. To achieve this, the second sensor 13 detects the light/dark transition between the respective registration mark and the background of this registration mark, the transport belt 1 or the printing material 3. In response to the detection of the individual registration marks, the second sensor 13 transmits a signal to the device 30. In addition, the angle of rotation of the rotary encoder 26 is transmitted to the device 30, said angle being measured at the START OF FRAME time. The device 30 comprises variable and fixed data regarding the START OF FRAME signal and regarding the START OF LINE signal, which data are output to the clock counter 20 or to the clock divider 21 and trigger imaging of the image frames or frames or the image lines by the imaging device 22 at the proper time. The fixed data of the device 3 characterize nominal points in time, at which imaging by the imaging device 22 is triggered without external influences and without error influences. The variable data take into account changes which, in the course of the calibration cycle, lead to imaging errors. The variable data for correcting the influence of the variable contact pressure of the pressure roller 27 are formed by data of the second sensor 13 and of the second rotary encoder 26 on the imaging cylinder 23. The corresponding values without error influences form the fixed data of the device 30, said data being the ideal data. The variable parameters comprise derivations from and errors of ideal data, and form the variable data of the device 30. The variable data are determined by means of calibration runs of the printing machine, in that the error influences are determined with the use of deviations of the registration marks in the course of time. Error influences include temperature influences on the imaging cylinder 23 and, in particular, on the printing cylinder 25, said influences resulting in circumferential changes. In addition, eccentricity errors of the printing cylinder 25 or of the imaging cylinder 23 are considered error influences, such eccentricity errors resulting in a periodic change of the path length of the individual image lines from the imaging device 22 to the nip 9. On the one hand, the addition of variable data to fixed data results in the delay data of the device 30, said data being transmitted to the clock counter 20, which counts clock numbers corresponding to these delay data after which a trigger signal or start signal is sent to the imaging device 22 for the application of an image to the imaging cylinder 23, said first start signal being the START OF FRAME signal. In so doing, clock numbers are allocated to the delay data. The clock counter 20 counts the number of pulses specified by the delay data, whereupon a START OF FRAME signal is directly generated. On the other hand, the divider factors, which are transmitted to the clock divider 21, are obtained, whereby said clock divider 21 starts to generate START OF LINE signals, which has been triggered by the START OF FRAME signal. The START OF LINE signals are obtained by dividing the pulses of the rotary encoder 26 by the divider factors. At the START OF FRAME signal, the imaging of a frame is triggered; at the START OF LINE signal, the imaging of an image line is triggered. In order to provide a registered print, the clock numbers of the clock counter 20 associated with the delay data are the lower, the higher the rotational speed changes of the printing cylinder 25 and of the imaging cylinder 23, connected with said printing cylinder by frictional engagement, are, said changes being caused by the contact pressure of the printing cylinder 25; the first start signal, i.e., the START OF FRAME signal, is triggered earlier by the corresponding clock number because the rotational speed change affects the registration accuracy of the application of the image frame or frame.

With the aforementioned feature, the image frame or frame reaches the nip 9 in a timely manner, and reaches nip 9 not too late because of the lower rotational speed of the printing cylinder 25. This first registration error, also referred to as the delay error, is measured during the calibration cycle by the second sensor 13 or registration sensor. The clock numbers of the clock divider 21 associated with the divider factors of the device 30 are required for accurately registered printing and become lower as the expansion of the rubber sheet cover of the printing cylinder 25 caused by the contact pressure of the printing cylinder 25 becomes greater; see FIGS. 1a, 1b. This second registration error, also referred to as the magnification error, is determined during the calibration cycle by measuring the registration marks by the second sensor 13 or registration sensor, as well as the angle of rotation by the rotary encoder 26, and by the subsequent determination of the mean value based on the measured data. The clock number is reduced by the clock divider 21 by the change of the resolution of the image lines caused by the expansion of the rubber sheet cover. With the reduction of the clock number as a consequence of a higher contact pressure, after which the second start signal, the START OF LINE signal, is generated, the image lines move closer together by the amount by which they have moved apart due to the expansion of the rubber sheet cover, i.e., the image lines move closer together and the second registration error is corrected.

In summary, the fixed data in the device 30 are not sufficient for printing in a highly accurate registered manner. Therefore, the clock number, after which the START OF FRAME signal is generated, is composed of fixed data, as well as of variable data. The variable data are used for the correction of influences on registration accuracy, for example, changes of the rotational speed of the printing cylinder 25 and also of eccentricity fluctuations of the printing cylinder 25 and of the imaging cylinder 23, i.e., the first and the second registration errors. The variable data refer to the sensor data of the second sensor 13 or to the angles of rotation of the second deflecting roller 14, the imaging cylinder 23 and the printing cylinder 25. The divider factors of the device 30 which are output to the clock divider 21 and which determine based on what angles of rotation of the imaging cylinder 23 the START OF LINE signals are generated, are also composed—similar to the delay data—of a variable and of a fixed component. The variable component of the delay data and of the divider factors is related to the contact pressure. A higher contact pressure of the pressure roller, and thus the printing cylinder 25, causes a shift of the image frame or frame, as well as printing image lines that are farther apart, i.e., the printing image is expanded and extends more in longitudinal direction.

When a printing material 3 is present between the printing cylinder 25 and the trans-port web 1, the effect of a changing contact pressure—which increases further with the increasing thickness of the printing material 3—is magnified. Consequently, printing materials 3 having different thicknesses cause different first registration errors and second registration errors. Therefore, during calibration, preferably the thickness of the printing material 3 is used as the component of variable data in the device 30. With the state of the art technology, variable data regarding the thickness of the printing material 3 are input in the device 30 prior to the printing process, i.e., following the calibration cycle, and are then available. Another option is that the variable data with respect to the thickness of the printing material 3 are determined during a calibration cycle, whereby the variable data are computed based on the rotational speed difference using $v_1$, without printing material in the nip 9, and $v_2$, with printing material 3 in the nip 9. In addition, the resolution of adjacent image lines is affected by the quality of the printing material 3. For example, for less compressible cardboard, the distances of adjacent image lines are slightly greater than in the case of soft, compressible paper. Therefore, the quality of the printing material 3 is used in a similar manner as the thickness of the printing material 3 as a component for the delay data which determine the times for the first start signal, the START OF FRAME signal, and for the second start signal, the START OF LINE signal. The above-described individual components, i.e., the component regarding the thickness and the quality of the printing material 3, the fixed and variable data, are added and produce the delay data of the device 30. These delay data result in a clock number, which is counted in the clock counter 20 and which initiates imaging, triggered by the first start signal and the second start signal, at a different time than originally; provided error influences do exist. This means that, in prior art, the influence of a printing material, specifically on the "magnification" error has been recognized, that, however, the calibration takes place with respect to a "bare" transport web and that printing material parameters are computed only as a type of variable problem parameters and are then added as such to the print jobs.

As opposed to this, the present invention justifiably uses as a different paradigmatic premise that assumes that, in executing a print job, the presence of printing material is not actually to be viewed as a problem situation but is to be viewed as a normal situation. Therefore, in accordance with the invention, the presence of printing material is considered as a given from the very beginning, and only a change of the printing material situation is additionally taken into account as quickly as possible.

Figure 4:
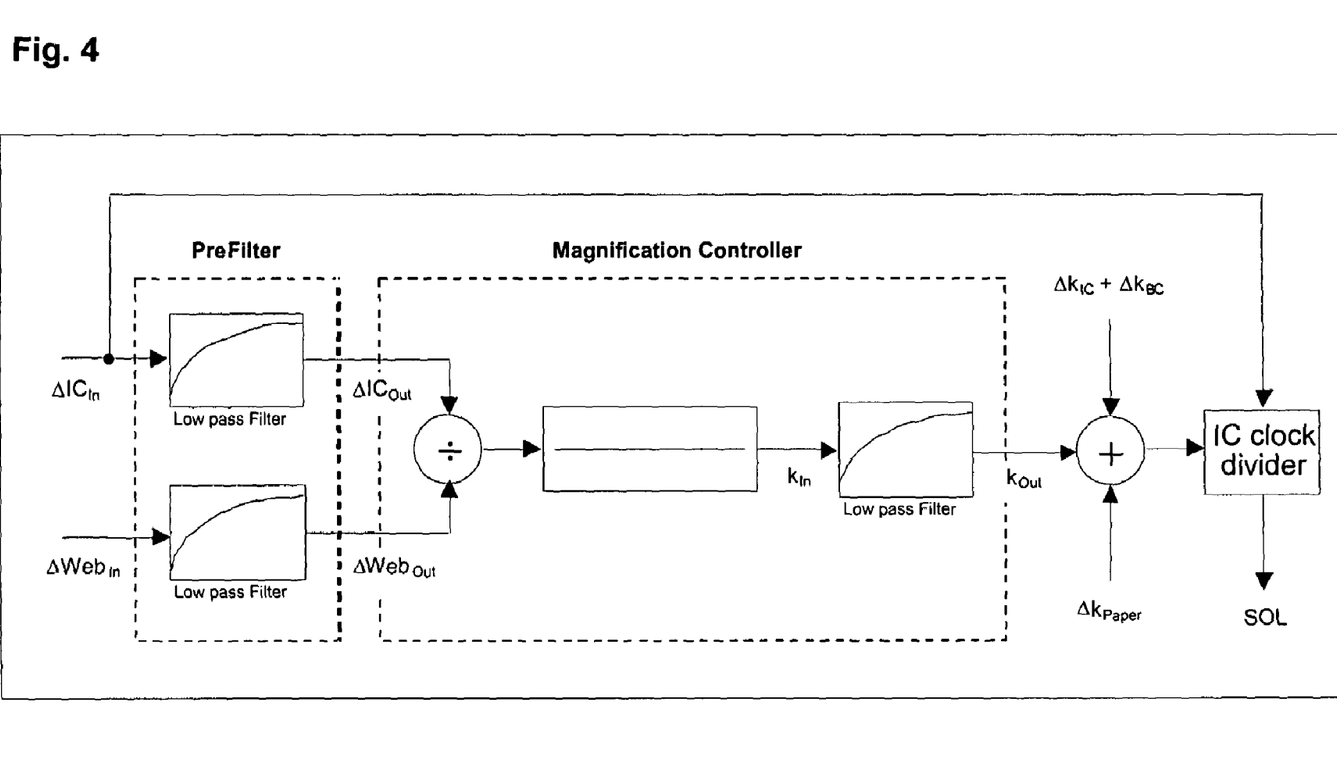
FIG. 4 a type of block circuit diagram of a control device to be used in accordance with the invention.

FIG. 4 now shows a block circuit diagram of a control device for carrying out the inventive method, which, hereinafter, will simply be referred to as the "controller".

As already mentioned above, the rotary encoder pulses of the transport web 1 ("Web") and the imaging cylinder ("IC") are input in a controller as the input signals $\Delta Web_{In}$ and $\Delta IC_{In}$.

With the controller shown in FIG. 4, these input signals first reach a pre-filter ("Pre-Filter"), which preferably consists of low-pass filters ("Low pass Filter"). As a result of this, relatively higher-frequency modulations can be filtered out of the rotary encoder clock rates, such as are caused, for example, by eccentricity errors of the cylinders.

The thusly filtered signals are related to each other as the values $\Delta Web_{Out}$ and $\Delta IC_{Out}$, and the result ($k_{In}$) is again damped by another low-pass filter ("Low pass Filter"). This then results in a correction value $k_{Out}$. This correction value is output, summed up with other correction values, to a clock generator ("IC clock divider"), i.e., clock divider 21 as in the previous figures, for control of the imaging cylinder 23 with which the respective START OF LINE (SOL) signal is output to the imaging cylinder.

The invention advantageously provides that an additional special correction value $\Delta k_{Paper}$ for changed printing material conditions in the gap or nip 9 be given in addition to the correction values for the clock generator for control ("IC clock divider") of the imaging cylinder 23, in order to adjust the control or regulation of the imaging cylinder 23 instantaneously to these changed conditions for the current still to be printed sheet and its START OF FRAME. Compared with prior art, there is the particular difference that a printing material value is not taken into account as an interference but that, based on the current printing material situation, a changed printing material situation detected is already taken into account for the current sheet by a corresponding A correction value. In addition, in accordance with the invention, the respectively last transient low-pass filter upstream of the clock generator for control ("IC clock divider") of the imaging cylinder 23 can be skipped in order to avoid this transient oscillation and thus transient phases; and/or the controller as a whole can be initialized with the changed correction value $\Delta k_{Paper}$ and/or sort of skipped in that an earlier $k_{In}$ or $k_{Out}$ value is used.

In an especially inventive manner, however, considering the filter equation for the last low-pass filter, the correction value $\Delta k_{Paper}$ is taken into account in the computation for the determination of the $k_{Out}$ value, which then affects specifically already the sheet following the current sheet; however, in this case it is necessary to add, to the output signal, the correction value in the manner described in the previous paragraph only until the control device has been initialized in order not to repeatedly take the correction value into account in a different way.

To be on the safe side, the preferred logical process of the inventive method will again be repeated and explained in other words.

The controller responds to the changes of the rotary encoder pulse signals (rotary encoder 26) of the imaging cylinder 23 in response to a printing material sheet in the nip 9.

Without additional measures, this response would occur in a delayed manner and result in a transient phase in the controller.

In order to avoid this transient phase, a re-initialization of the controller takes place, whereby the controller is adapted instantly to the changed printing material situation.

During re-initialization, the correction value $\Delta k_{Paper}$ due to the calibration of the printing machine as described in conjunction with FIGS. 1 through 3 is used, i.e., the parameter which describes the magnification effect.

Re-initialization occurs at a time at which the printing material situation in the nip 9 changes. Inasmuch as at this time the print lines or image lines have already been written for the current sheet, the change of the printing material situation for this sheet must be taken into account already at the START OF FRAME time of said sheet. This is achieved in that the correction value $\Delta k_{Paper}$ at this START OF FRAME time is initially added to the value $k_{Out}$ and subsequently again taken out at the time of re-initialization of the controller.

Additional measures for retaining a stable operating state are the pre-filters for the rotary encoder signals (encoder signals) for damping eccentricity frequencies and other high frequencies, and for masking gaps between the printing material sheets (interframes).

(For a stable operating state of the controller, however, it would be counter-productive to change the time constant of the last low-pass filter in order to reduce the delay of the filter, because this, on the contrary, would lead to undesirable "dynamizing".)

The invention claimed is:

1. Method of preventing a registration error while printing at least one printing image, wherein, in order to control or adjust the correct length of the printing image, the start and/or the distance of the printing image lines of the printing image are controlled by determining the ratio of the number of rotary encoder signals of a transport web counted during a specific time interval, said transport web transporting the printing sheets, to the number of rotary encoder signals of a cylinder of a printing unit detected during the same time interval, said cylinder participating in the printing operation and moving directly or indirectly with the transport web, and by taking into account a change of this ratio as a correction, said ratio being a function of a printing sheet located in a printing nip between the transport web and the printing unit, and whereby, in order to achieve the desired registration accuracy, a certain mean value of time is determined by way of determining said ratio, wherein a changed printing material situation occurring in said printing nip between the transport web and the printing unit is used to achieve registration accuracy by immediately taking into consideration a correction value that takes into account the changed printing material situation, wherein, during the current control step, a control device that is being used is re-initialized with the appropriately stated correction value for control of the registration accuracy of the currently to be printed sheet, said sheet being subject to the mentioned change of the printing material situation, and that, as a result of this, transient phases otherwise caused by a delayed response of the control device are prevented, and wherein a printing material gap existing between two successive sheets is masked relative to the control device or in the control device.

2. Method as in claim 1, wherein, for a changed printing material situation, only the difference between a previous printing material and the currently present printing material is taken into account in the way of a difference.

3. Method as in claim 1, wherein, for the respective correction value, a table of values that has been obtained based on calibrations is accessed.

4. Method as in claim 1, wherein information relating to sheet feeding is used to identify the printing material currently to be printed as it enters the printing nip.

5. Method as in claim 1, wherein the correction value is used in a filter equation of a filter of a control device.

6. Method as in claim 1 wherein a correction value which takes into account a changed printing material situation in the printing nip between the transport web and the printing unit is added in order to achieve the desired registration accuracy for the current sheet to be printed, while the output signal of a control device is taken instantly into account for the sheet currently to be printed regarding said sheet's start of the printing image.

7. Method as in claim 6, wherein the correction value is only added to the output signal until the control device is initialized.

8. Method as in claim 1, wherein cylinder eccentricity frequencies and similar relatively higher frequencies are filtered out of the rotary encoder signals.

9. Method as in claim 1, wherein the correction value is only added to the output signal until the control device is initialized.

10. Method as in claim 1, wherein the at least one printing image comprises at least one color separation image of a multi-color print.

11. Method as in claim 10, wherein the at least one printing image is printed with the use of a digital printing machine.

12. Method as in claim 11, wherein the at least one printing image is printed with an electro-photographically operating printing machine.

13. Method of preventing a registration error while printing at least one printing image, wherein, in order to control or adjust the correct length of the printing image, the start and/or the distance of the printing image lines of the printing image are controlled by determining the ratio of the number of rotary encoder signals of a transport web counted during a specific time interval, said transport web transporting the printing sheets, to the number of rotary encoder signals of a cylinder of a printing unit detected during the same time interval, said cylinder participating in the printing operation and moving directly or indirectly with the transport web, and by taking into account a change of this ratio as a correction, said ratio being a function of a printing sheet located in a printing nip between the transport web and the printing unit, and whereby, in order to achieve the desired registration accuracy, a certain mean value of time is determined by way of determining said ratio, wherein a changed printing material situation occurring in said printing nip between the transport web and the printing unit is used to achieve registration accuracy by immediately taking into consideration a correction value that takes into account the changed printing material situation, and wherein a printing material gap existing between two successive sheets is masked relative to a control device or in a control device.

14. Method of preventing a registration error while printing at least one printing image, wherein, in order to control or adjust the correct length of the printing image, the start and/or the distance of the printing image lines of the printing image are controlled by determining the ratio of the number of rotary encoder signals of a transport web counted during a specific time interval, said transport web transporting the printing sheets, to the number of rotary encoder signals of a cylinder of a printing unit detected during the same time interval, said cylinder participating in the printing operation and moving directly or indirectly with the transport web, and by taking into account a change of this ratio as a correction, said ratio being a function of a printing sheet located in a printing nip between the transport web and the printing unit, and whereby, in order to achieve the desired registration accuracy, a certain mean value of time is determined by way of determining said ratio, wherein a changed printing material situation occurring in said printing nip between the transport web and the printing unit is used to achieve registration accuracy by immediately taking into consideration a correction value that takes into account the changed printing material situation, wherein, for the respective correction value, a table of values that has been obtained based on calibrations is accessed.

15. Method of preventing a registration error while printing at least one printing image, wherein, in order to control or adjust the correct length of the printing image, the start and/or the distance of the printing image lines of the printing image are controlled by determining the ratio of the number of rotary encoder signals of a transport web counted during a specific time interval, said transport web transporting the printing sheets, to the number of rotary encoder signals of a cylinder of a printing unit detected during the same time interval, said cylinder participating in the printing operation and moving directly or indirectly with the transport web, and by taking into account a change of this ratio as a correction, said ratio being a function of a printing sheet located in a printing nip between the transport web and the printing unit, and whereby, in order to achieve the desired registration accuracy, a certain mean value of time is determined by way of determining said ratio, wherein a changed printing material situation occurring in said printing nip between the transport web and the printing unit is used to achieve registration accuracy by immediately taking into consideration a correction value that takes into account the changed printing material situation, wherein a correction value which takes into account a changed printing material situation in the printing nip between the transport web and the printing unit is added in order to achieve the desired registration accuracy for the current sheet to be printed, while the output signal of a control device is taken instantly into account for the sheet currently to be printed regarding said sheet's start of the printing image, and wherein the correction value is only added to the output signal until the control device is initialized.

* * * * *